(12) United States Patent
Côté et al.

(10) Patent No.: US 10,965,807 B2
(45) Date of Patent: Mar. 30, 2021

(54) SYSTEMS AND METHODS FOR ANOMALY OR FRAUD DETECTION

(71) Applicant: ELEMENT AI INC., Montreal (CA)

(72) Inventors: Marie-Claude Côté, Montréal (CA); Pegah Kamousi, Montréal (CA); Fanny Lalonde Lévesque, Montréal (CA); Alexei Nordell-Markovits, Montréal (CA); Adam Salvail-Bérard, Montréal (CA)

(73) Assignee: ELEMENT AI INC., Montreal (CA)

( * ) Notice: Subject to any disclaimer, the term of this patent is extended or adjusted under 35 U.S.C. 154(b) by 0 days.

(21) Appl. No.: 16/585,206

(22) Filed: Sep. 27, 2019

(65) Prior Publication Data

US 2020/0106880 A1  Apr. 2, 2020

Related U.S. Application Data

(60) Provisional application No. 62/738,068, filed on Sep. 28, 2018.

(51) Int. Cl.
*H04M 3/22* (2006.01)
*H04M 3/436* (2006.01)
(Continued)

(52) U.S. Cl.
CPC .......... *H04M 3/2281* (2013.01); *G06N 3/049* (2013.01); *H04M 3/42059* (2013.01); *H04M 3/4365* (2013.01)

(58) Field of Classification Search
CPC .......... G06Q 20/4016; G06Q 30/0248; G06Q 50/265; G06Q 10/0635; G06Q 20/383; G06Q 30/0225; G06N 20/00; G06N 7/005; G06N 5/02; G06N 3/08; G06N 5/04; G06N 3/02; G06N 3/0427; H04L 63/0876; H04L 63/102; H04L 63/1425; H04L 67/22; H04L 2463/144; H04L 63/1483; H04L 63/20; H04L 67/306; H04L 63/105; H04L 63/12; H04L 63/126; H04L 63/1416; H04L 63/1433; H04L 63/1441; H04L 65/1076; H04L 65/1079; H04W 12/06; H04W 12/12; H04W 12/00505; H04W 12/08;
(Continued)

(56) References Cited

U.S. PATENT DOCUMENTS

2004/0249866 A1* 12/2004 Chen ................ G06Q 40/08
2016/0150414 A1* 5/2016 Flaks ................ H04M 3/436
455/406

OTHER PUBLICATIONS

Koiser, N., "Toll Fraud detection in VoIP Networks Using Artificial Neural Networks", University of Nairobi School of Computing and Informatics, P58/61547/2010.
(Continued)

*Primary Examiner* — Kwasi Karikari
(74) *Attorney, Agent, or Firm* — Norton Rose Fulbright Canada LLP

(57) ABSTRACT

A system for anomaly estimation for a telephonic call is described, receiving a call object including an identifier field associating the call object to a purported user; retrieving a user data object associated with the purported user, and processing the user data object to retrieve one or more vectorized user features associated with the purported user. A neural network processes the one or more vectorized call features and the one or more vectorized user features through a machine learning model.

19 Claims, 4 Drawing Sheets

(51) Int. Cl.
 *H04M 3/42* (2006.01)
 *G06N 3/04* (2006.01)
(58) Field of Classification Search
 CPC ........... H04W 12/00; H04W 12/00409; H04W 12/0605; H04W 12/1204; H04W 4/24
 See application file for complete search history.

(56) References Cited

OTHER PUBLICATIONS

Mirsky, Y. et al., "Kitsune: An Ensemble of Autoencoders for Online Network Intrusion Detection", May 27, 2018, arXiv:1802.09089v2.
Olszewski, D. et al., "Employing Self-Organizing Map for Fraud Detection" The 12th International Conference on Artificial Intelligence and Soft Computing (ICAISC 2013), Jun. 2013, pp. 150-161, ISBN: 978-3-642-38657-2.
Wiens, A. et al., "Approach on Fraud Detection in Voice Over IP Networks Using Call Destination Profiling Based on an Analysis of Recent Attacks on FritzIBox Units", The Sixth International Conference on Emerging Network Intelligence, (EMERGING 2014) IARIA, Aug. 2014, pp. 29-34, ISSN: 2326-9383, ISBN: 978-1-61208-357-5.
Alves, R. et al., "Discovering Telecom Fraud Situations Through Mining Anomalous Behavior Patterns", Proceedings of the DMBA Workshop on the 12th ACM SIGKDD, 2006.
Hilas, C.S. et al., "An Application of Supervised and Unsupervised Learning Approaches to Telecommunications Fraud Detection", Knowledge-Based Systems, vol. 21, issue 7 (2008) p. 721 to 726.
Hoffstadt, D. et al., "A Comprehensive Framework for Detecting and Preventing VoIP Fraud and Misuse", 2014 International Conference on Computing, Networking and Communications (ICNC), Feb. 2014, pp. 807-813, doi:10.1109/ICCNC.2014.6785441.
Wu, C.C. et al., "Detecting VoIP Traffic Based on Human Conversation Patterns", https://www.researchgate.net/publication/221418957, Jan. 2008.

* cited by examiner

SYSTEMS AND METHODS FOR ANOMALY OR FRAUD DETECTION

CROSS-REFERENCE

This application is a non-provisional of, and claims all benefit, including priority to, U.S. Application No. 62/738,068 (Ref.: 10203381-2USPR), entitled "SYSTEMS AND METHODS FOR ANOMALY OR FRAUD DETECTION", filed on 2018 Sep. 28, incorporated herein by reference in its entirety.

FIELD

Embodiments of the present disclosure generally relate to the field of artificial intelligence, and more specifically, embodiments relate to devices, systems and methods for anomaly or fraud detection in relation to call related fraud.

INTRODUCTION

The openness, cost-effectiveness and innovative nature of voice over IP (VoIP) services has allowed for integration of different media such as voice and video. VoIP services have encouraged the widespread migration from circuit-switched networks to VoIP providers.

However, the lack of strong built-in security mechanisms and the use of open standards in IP-based network have attracted attackers and malicious users to VoIP systems.

Example fraud management systems employ rule-based systems that rely on expert knowledge, post-processing and delayed, offline detection of fraudulent behaviour. Such methods can have several shortcomings. First, they rely on labelled data indicating calls that are fraudulent. Second, they use the information about the call without considering the context of the user to/from whom the call is made. Finally, they flag a call after it has already ended, at times allowing days before the party victimized by the attack was notified.

Fraud is an adaptive crime, often perpetrated by creative and persistent players, and as such it necessitates automated and efficient processes to detect and prevent fraud as it unfolds.

SUMMARY

Embodiments described herein can process call data in connection with the parties involved in the call. This approach does not ignore the valuable information about the behavioural patterns of the users and sheds light on whether a call matches the existing patterns. Embodiments described herein can process call data to flag fraudulent events (or potentially fraudulent events) such as, for example, subscription fraud (obtaining service with a false identity and without paying) and superimposed fraud (obtaining resources from legitimate users by gaining access to their phone accounts), and provide practical, technical solutions using computer implemented approaches. Such attacks can cost telecommunication companies billions of dollars per year and also compromise the privacy and security of the users of such network, subjecting them to the risk of identity theft and eavesdropping.

A source of data used to detect fraudulent events is the records generated as the users place calls through the VoIP system. Upon placing a call over VoIP by a user, vendor-specific communication and billing data is transcoded into Call Detail Record (CDR) and Internet Protocol Detail Record (IPDR), both of which are captured by the recorder. This data can then be used not only for billing purposes but also to detect fraud.

VoIP service sessions have two or more participants over a partial or complete Internet-based connection. The session, or call, is started by one of the participants (the call initiator) and it is received by one or more participants (the call recipients). The session is managed by different elements, such as services, gatekeepers and endpoints (or end users).

These sessions can be various combinations of IP networking, public switched telephone network (PSTN) transmission and cellular telephony. The VoIP CDRs and IPDRs contain the identifiers of call participants, the call type (voice, SMS, etc.), the time the call was started and ended, the call progress state, the final call completion codes for each call, and the call payment type (or other combinations thereof).

Embodiments described herein can provide systems and processes that computationally attempt to learn "representations" of the data offline, lending themselves to efficient online fraud detection. In some embodiments, new data sources external to the VoIP system are incorporated which might provide insight into the history and identity of the attackers. Specific approaches are described in various embodiments that provide particular machine learning approaches to learn representations.

In an aspect, embodiments described herein can provide a computer implemented method for anomaly estimation for a telephonic call. A call object receiver receives a call object including an identifier field associating the call object to a purported user. A user data object receiver retrieves a user data object associated with the purported user, and processes the user data object to retrieve one or more vectorized user features associated with the purported user.

A feature processing engine extracts, from the call object, one or more vectorized call features, and a neural network (e.g. stored at a data storage device) processes the one or more vectorized call features and the one or more vectorized user features through a machine learning model to generate an output data value representing a likelihood at which the machine learning model assesses the call object to have been initiated by the purported user. A call routing decision support engine queries a user profile using at least the generated likelihood to obtain a decision output representative of a control signal for a downstream action for call handling. The downstream action can include flagging a call as a potentially fraudulent event, for example.

In an aspect, the one or more vectorized call features extracted from the call object are static embeddings extracted from at least one of a call detail record, an IP detail record, voice samplings, or records extracted from external data sources.

In an aspect, the one or more vectorized call features include at least one of phone numbers originating and receiving the call, a starting timestamp of the call, a billing phone number that is charged for the call, internet protocol detail record sequence numbers, internet protocol detail record start timestamps or end timestamps, internet protocol detail record average packet latencies, internet protocol detail record codecs, internet protocol detail record internet protocol addresses, internet protocol detail record call completion codes, an internet protocol detail record personal identification number (PIN), internet protocol detail record port numbers, or internet protocol detail record egress device internet protocol addresses.

In an aspect, the call object is a new call object received at a call router; and the one or more vectorized call features extracted from the call object are dynamic embeddings extracted from at least one of a call detail record, an IP detail record, voice samplings, or records extracted from external data sources, the dynamic embeddings generated as the new call object is handled by the call router in real or near real-time.

In an aspect, the one or more vectorized call features are extracted in a continuous flow as the one or more vectorized call features become available during the call in real or near real-time.

In an aspect, the machine learning model continuously or periodically generates the output data value as new one or more vectorized call features become available to the machine learning model.

In an aspect, the machine learning model is implemented using a recurrent neural network configured such that inputs are discrete events that the machine learning model encodes into a hidden layer of the recurrent neural network.

In an aspect, the machine learning model generates a manifold representation based at least on the one or more vectorized user features and the one or more vectorized call features, establishing a constellation of points within a higher-dimensional space having at least a first point representative of the call object, and at least a second point representative of the user profile associated with the purported user; a distance is determined in the higher-dimensional space between the first point and the second point; and the distance is utilized to generate the output data value representing the likelihood at which the machine learning model assesses the call object to have been initiated by the purported user.

In an aspect, the distance is normalized based on an aggregate of generated distances, and the normalized distance is utilized to generate the output data value representing the likelihood at which the machine learning model assesses the call object to have been initiated by the purported user.

In an aspect, the user profile is a data structure that includes data fields that are appended with each decision output such that the user profile provides a log of past decision outputs.

In an aspect, the downstream action includes at least one of: connecting or terminating the call; reporting the call; or flagging the call to be marked as a potential threat in the user profile.

In an aspect, the machine learning model generates a confidence level associated with the likelihood at which the machine learning model assesses the call object to have been initiated by the purported user, the confidence level utilized in determining the decision output representative of the control signal for the downstream action for call handling.

In an aspect, there is provided a computer readable medium storing machine interpretable instructions, which when executed by a processor, cause the processor to perform a method in accordance with any one of the above aspects or embodiments.

In an aspect, there is provided a physical special purpose computing appliance configured for integration with one or more computing devices resident in a data center, the physical special purpose computing appliance including specialized hardware and software for implementing the system for anomaly estimation for a telephonic call in accordance with any one of the above aspects or embodiments.

Corresponding apparatuses, interfaces, devices, hardware, and software (e.g., computer program products, such as non-transitory computer readable media storing machine interpretable instructions for execution on one or more processors) are contemplated in various embodiments.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
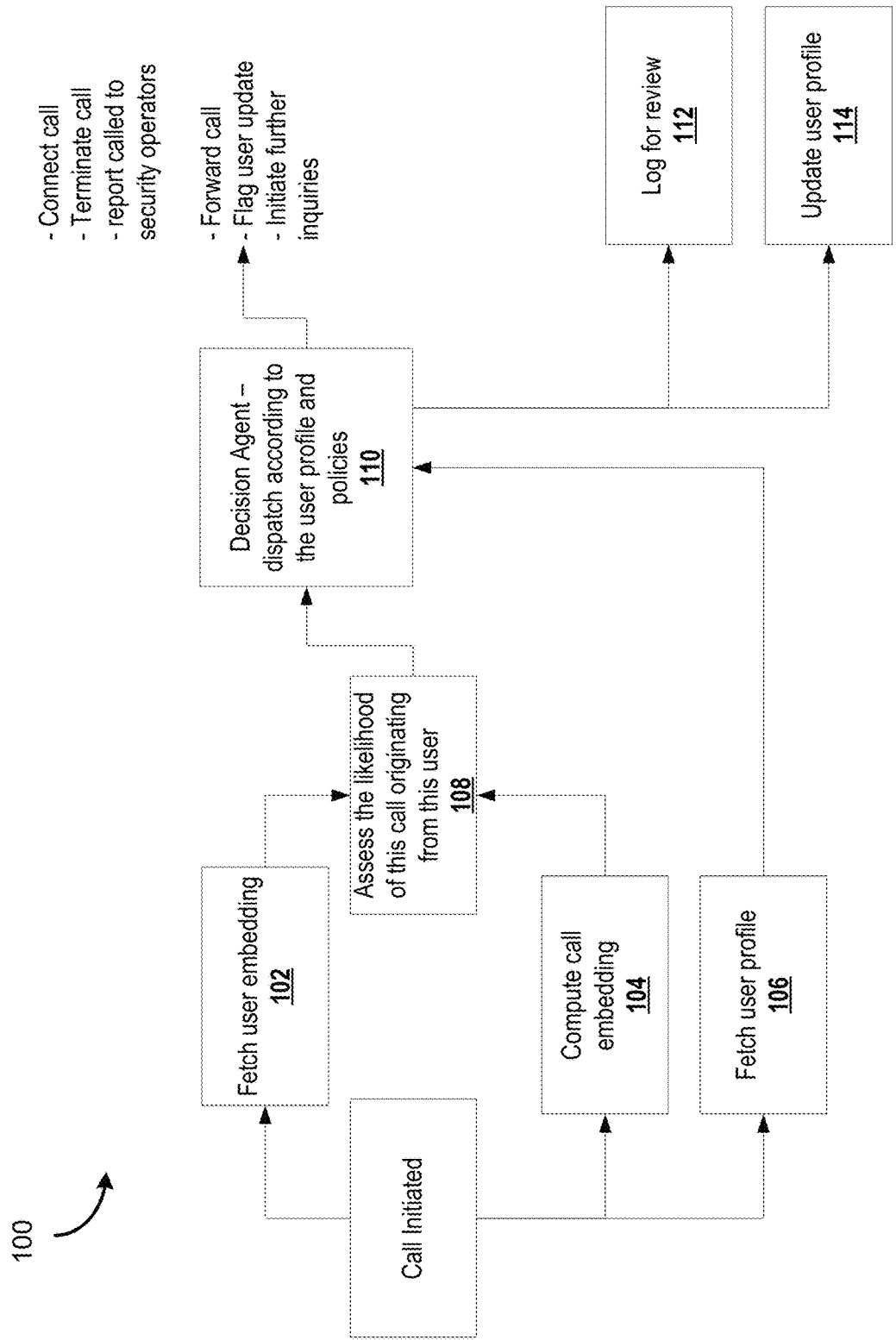
FIG. 1 is an example method for anomaly detection for a call record under analysis, according to some embodiments.

Offline fraud detection can involve flagging a call once it has already ended. While this can still prevent further damage done by the same foul player, it would do so only after (possibly considerable) costs are already incurred. Given the magnitude of data produced by telecom activities every second, a system that aims to achieve online fraud detection can perform processing/modeling offline (or at least a portion thereof) to efficiently use resources and trigger actions.

An approach for detecting anomalous calls by automatically learning representations of the users and calls is described in various embodiments, using techniques that perform substantial processing of data offline, leaving only a portion of the processing to be done on-the-fly or in near real-time. The approach is implemented by configured computer components, including computer processors that maintain machine learning model data architectures, which can include, for example, artificial neural networks where a series of interconnected data objects are stored thereon computer memory.

The interconnections can be represented as weighted edges between connected nodes or computational neurons stored in the computer memory, and the weighted edges can be stored as data pertaining to each of the interconnected data objects. The data objects themselves can be stored in corresponding data structures, and, for example, the weighted edges can be stored in relation to metadata values associated with pointers between data structures. The neural network, and the interconnections between the interconnected data objects can be updated and maintained over time in accordance with functions that modify their values responsive to outcomes. The interconnected data objects can, for example represent features (or transformations or combinations thereof) and the weights on interconnections can represent parameters relating to an underlying representation of relationships that yield various outputs. For example, during training, the weightings can be modified based on a reward or a penalty function such that a transfer function/policy function represented by the interconnected data objects is updated as iterations occur. The trained neural network then be used to establish or generate predictions through a traversal/propagation of information through the trained neural network.

A technical challenge of preprocessing the data from the user is to make sure that the transformed data is in a format that will be beneficial for making quick analyses online. A solution to such a challenge can be provided by embodiments described herein based on techniques from a subfield of machine learning called representation learning. This subfield aims to learn an optimal representation (transformed data) that will then be immediately useful to the learner and quicker online algorithm.

The goal is then to build a representation of a user, in a vector space, which would serve as the user vector representation. This may also be referred to as vectorized embeddings. The user vector representations may be updated at any given frequency according to the degree of accuracy required. Once a user vector representation or embedding is built, it can be used for offline analysis including anomaly detection and community analysis. Low-touch post-processing and heuristics can be used to detect anomalous behaviours once a call is requested. This may data may also be used for a user profile. The user profiles can also be updated.

FIG. 1 is an example method for anomaly detection for a call record under analysis, according to some embodiments. The method 100 utilizes machine learning (including, in some embodiments, neural networks) to convert features of the user data and call data into vectorized embeddings. This can be a representation of user data. This can be a compressed version of the user data, for example. This can be in a format that enables efficient online processing against call data, for example.

A trained neural network is provided to assess a likelihood of a call to originate or be directed to a purported user. A user profile storing previous decisions based on prior call decisions is utilized for decision making, and a representation of user data is generated based on data obtained in respect of a user over a recorded duration/history of interactions with an organization. The user data can include, for example locations of previous calls, average durations, etc. Where there is a new customer, there may be a limited set of information available, which may reduce a confidence level of a generated analysis.

Figure 2:
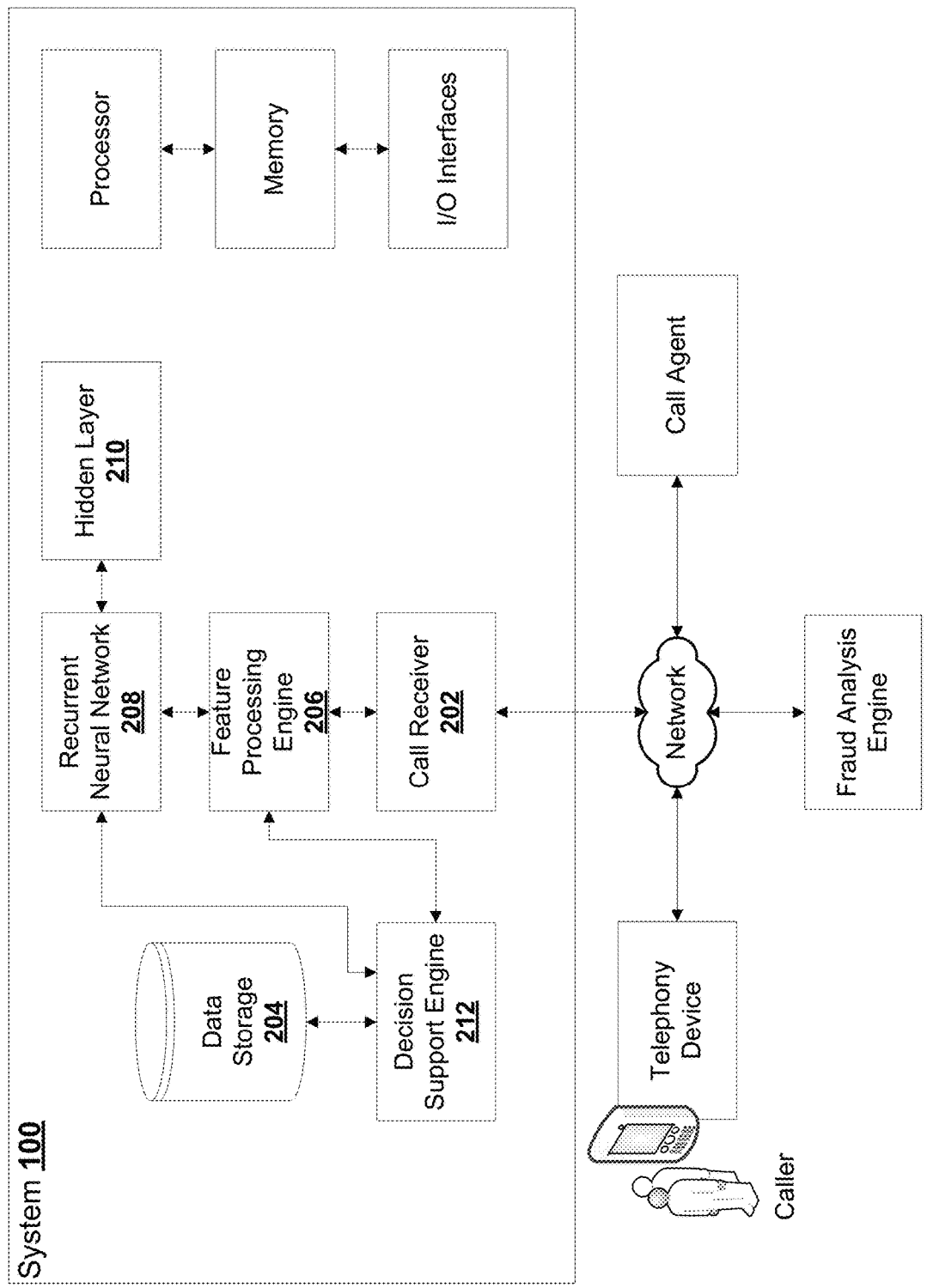
FIG. 2 is an example system for anomaly detection for a call record under analysis, according to some embodiments.

FIG. 2 is an example system for anomaly detection for a call record under analysis, according to some embodiments.

The system 200 is shown in an example physical environment. The system 200 is shown as a non-limiting implementation, and variations are contemplated, using different, alternate, more, or less components. Further, the components shown are implemented in software, hardware, embedded firmware, or a combination thereof.

The system can involve a computing device such a server, and may include at least one processor, memory, at least one I/O interface, and at least one network interface.

Referring to both FIGS. 1 and 2, a user initiated call data for analysis is received at 102, and the user initiated call data is associated with a purported user (e.g., call originator or a target individual). The call data is linked. The call is received at call receiver 202, and represented as a call object.

At 104, user information associated with the purported user is retrieved from a data storage 204, the user information vectorized to establish a set of user features (e.g., user embeddings), represented in the form of one or more multi-dimensional vectors. The multi-dimensional vectors include all or a subset of the data. In some embodiments, the multi-dimensional vectors provide a compressed representation.

Figure 4:
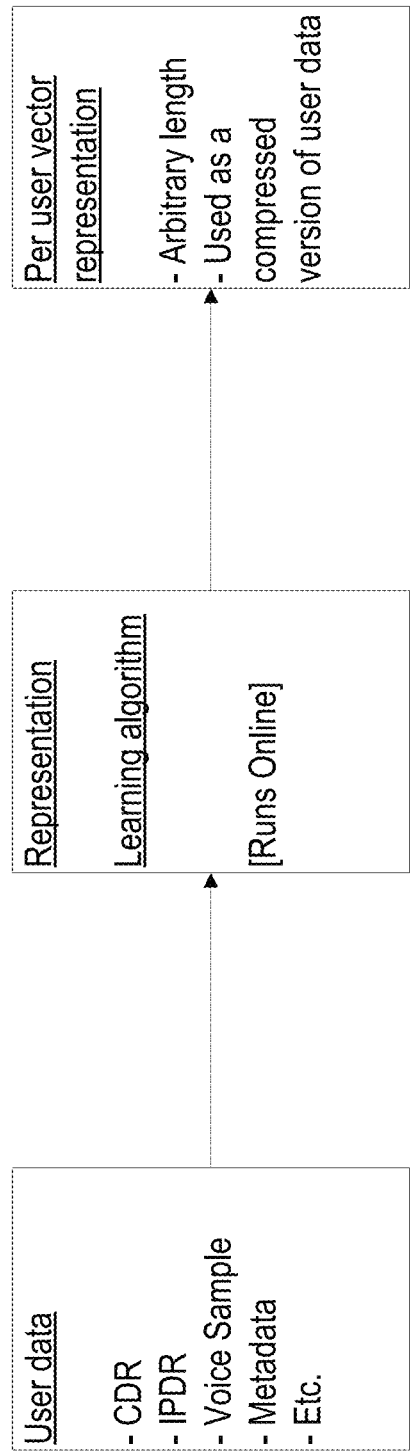
FIG. 4 is an example method for feature extraction from the user details, according to some embodiments.

As shown in FIG. 4, user data features extracted from user data can include information received from historical call data/IP detail records associated with the user, voice samples, associated metadata, etc., which are incorporated into vector representations that provide compressed representations of user data.

Data sources for feature generation, for example, can include CDRs collected from operational VoIP systems, as well as IPDRs collected by the operator of the underlying network, which is often the same organization.

There may be additional features generated based on, for example: indicators that the user's phone may be compromised and/or the user may be the victim of identity theft, conversation patterns of the user extracted directly from the network traffic, feeds of blacklisted phone numbers, historical data related to the call recipients, call content obtained as cleartext over PSTN wires or transmission, and content monitoring.

An example IPDR is provided below:

```
1    <IPDR>
2        <IPDRCreationTime>2009-07-07T13:21:08.031+02:00</IPDRCreationTime>
3        <seqNum>1</seqNum>
4        <subscriberID>Vendor Phone-1027365692</subscriberID>
5        <hostName>author.gateway.123</hostName>
6        <ipAddress>192.168.1.197</ipAddress>
7        <startTime>2009-07-07T18:29:35.448+02:00</startTime>
8        <endTime>2009-07-07T18:51:31.448+02:00</endTime>
9        <timeZoneOffset>60</timeZoneOffset>
10       <callCompletionCode>CC</callCompletionCode>
11       <originalDestinationId>555-066-0023</originalDestinationId>
12       <uniqueCallId>52s70uj5-1507-2954-xspx-7b86x2a23q66</uniqueCallId>
13       <imsiIngress>445594063997989</imsiIngress>
14       <esnIngress>49916516</esnIngress>
15       <disconnectReason>NormalCallClearing</disconnectReason>
16       <ani>555-467-0100</ani>
17       <pin>6333276</pin>
18       <serviceConsumerType>EU</serviceConsumerType>
19       <startAccessTime>2009-07-07T18:29:14.448+02:00</startAccessTime>
20       <callDuration>133700</callDuration>
21       <averagePacketLatency>105</averagePacketLatency>
22       <type>V</type>
23       <feature>H</feature>
24       <incomingCodec>G726</incomingCodec>
25       <ipAddressEgressDevice>192.168.1.205</ipAddressEgressDevice>
26       <portNumber>4724</portNumber>
27       <homeLocationIdEgress>MT43AGR5</homeLocationIdEgress>
28   </IPDR>
```

An example CDR is provided below:

| ID | CALLING NUMBER | CALLED NUMBER | START TIME | END TIME | CALL TYPE | CHARGE | CALL RESULT |
|---|---|---|---|---|---|---|---|
| 9ea09bde-5922-4922-a4a1-ae86658bb660 | 8131166797 | 3470914600 | 2016-03-04T00:10:05.681+05:30 | 2016-03-04T00:10:05.681+05:30 | VOICE | 0.84 | ANSWERED |
| 1b614c81-aa0a-494d-904b-91b1ccd8f75f | 2454934925 | 9696756010 | 2016-03-05T12:55:16.639+05:30 | 2016-03-05T12:55:16.639+05:30 | SMS | 0.92 | BUSY |

At 106, a feature processing engine 206 extracts, from the call object, one or more vectorized call features.

Figure 3:
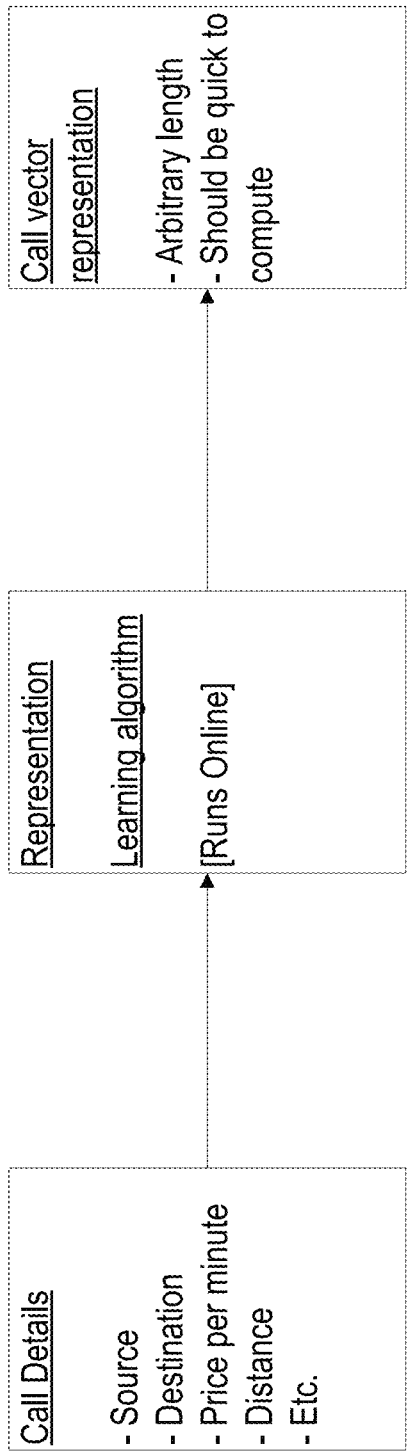
FIG. 3 is an example method for feature extraction from the call details, according to some embodiments.

As shown in FIG. 3, call data features extracted from call data can include information such as call source, destination, price per minute, distance, etc., which are incorporated into vector representations that provide compressed representations of user data. Information that may be extracted may include features representative of: average call duration, a number of answered calls, calls to/from a different area code, a number of weekday calls (Monday-Friday), a number of daytime calls (9 am-5 pm), average number of calls received per day, average number of calls originated per day, number of unique area codes called, among others.

In a first aspect, the one or more vectorized call features extracted from the call object are static embeddings extracted from at least one of a call detail record, an IP detail record, voice samplings, or records extracted from external data sources. The one or more vectorized call features can include, for example, at least one of phone numbers originating and receiving the call, a starting timestamp of the call, a billing phone number that is charged for the call, internet protocol detail record sequence numbers, internet protocol detail record start timestamps or end timestamps, internet protocol detail record average packet latencies, internet protocol detail record codecs, internet protocol detail record internet protocol addresses, internet protocol detail record call completion codes, an internet protocol detail record personal identification number (PIN), internet protocol detail record port numbers, or internet protocol detail record egress device internet protocol addresses.

In a second aspect, the call object is a new call object received at a call router; and the one or more vectorized call features extracted from the call object are dynamic embeddings extracted from at least one of a call detail record, an IP detail record, voice samplings, or records extracted from external data sources, the dynamic embeddings generated as the new call object is handled by the call router in real or near real-time.

The one or more vectorized call features are extracted in a continuous flow as the one or more vectorized call features become available during the call in real or near real-time, and the machine learning model continuously or periodically generates the output data value as new one or more vectorized call features become available to the machine learning model.

These two aspects (static embedding and dynamic embedding) are described in more detail further in the specification.

In this example, the machine learning model can be implemented using a recurrent neural network 208 configured such that inputs are discrete events that the machine learning model encodes into a hidden layer 210 of the recurrent neural network 208.

At 108, a neural network processes the one or more vectorized call features and the one or more vectorized user features through the machine learning model of neural network 208 to generate an output data value representing a likelihood at which the machine learning model assesses the call object to have been initiated by the purported user.

The machine learning model generates a manifold representation based at least on the one or more vectorized user features and the one or more vectorized call features, establishing a constellation of points within a higher-dimensional space having at least a first point representative of the call object, and at least a second point representative of the user profile associated with the purported user; a distance is determined in the higher-dimensional space between the first point and the second point; and the distance is utilized to generate the output data value representing the likelihood at which the machine learning model assesses the call object to have been initiated by the purported user.

In some embodiments, the distance is normalized based on an aggregate of generated distances, and the normalized distance is utilized to generate the output data value representing the likelihood at which the machine learning model assesses the call object to have been initiated by the purported user. In an aspect, the machine learning model generates a confidence level associated with the likelihood at which the machine learning model assesses the call object to have been initiated by the purported user, the confidence level utilized in determining the decision output representative of the control signal for the downstream action for call handling.

At 110, a call routing decision support engine 212 (e.g., a decision agent) queries a user profile using at least the generated likelihood to obtain a decision output representative of a control signal for a downstream action for call handling, the routing based at least on the user profile and company policies, leading to one or more downstream actions, including connecting calls, terminating calls, reporting calls, forwarding calls, flagging user profiles, initiating additional queries, among others.

At 112, the call object may be flagged for review, and at 114, the user profile data structure has a record appended to the data structure to record the decision of the decision support engine 212 such that an aggregate record is developed over a period of time that can be utilized by the decision support engine in relation to a particular user profile.

In some embodiments, the decision support engine 212 is coupled to an interface engine, which is configured to generate or maintain one or more agent interfaces rendered on a display of an administrator or a call agent. The agent interfaces receive the output data value representing a likelihood at which the machine learning model assesses the call object to have been initiated by the purported user, and based on the output data value, modify one or more visual or interactive characteristics of one or more interactive graphical objects rendered on the display.

The vectorized user embedding can be a static embedding based on extracted statistics or a dynamic embedding based on user data time series.

Static Embedding Based on Extracted Statistics

A neural embedding process can automatically learn a manifold where both the users and the calls lie. This can be done based on the data that is available, including the call detail record (CDR), IP detail record (IPDR), voice sampling and external data sources.

Once the users and calls are embedded in a high dimensional space, the problem of anomaly detection can be approached as a ranking problem whereby an approach similar to those of content-based/collaborative recommender systems, would be used to rank a call as to how relevant it is to a certain user, either as the initiator or receiver of the call. In other words, once the embeddings are computed, the users and calls are established as points in the same vector space, and the system 200 would use relevant measures of distance and proximity to compute the relevance of a call to a user.

The embeddings, of some embodiments, are static and computed offline but updated frequently as more data becomes available. This approach makes it feasible to perform online anomaly detection as the cost of positioning a new call in the space and detecting its score relative to the user would be minimal.

The user/call data would be presented to the embedding algorithm as a "bag of features".

For a specific user, this could be simple features extracted from the length of their calls, the locations of their place/received calls, the starting time of their calls, the phone number originating and receiving the calls, etc.

Similarly, the call would be represented as a bag of features from the CDR. Features may comprise the phone numbers originating and receiving the call, the starting time of the call and the billing phone number that is charged for the call. In addition, whenever the network operator underlying the VoIP system is closely allied to the VoIP operator, the corresponding IPDR records may be mined for yet more features. The analysis may be conducted periodically, such as every month or every week.

Dynamic Embedding Based on User Data Time Series

While the static representation above makes it possible to have a shared embedding for users and the calls by posing them as a bag of features, it can fail to leverage the temporal nature of data, the ordering of the events as they happened. An alternate approach is described in some embodiments.

In order to address this issue, it is possible to build the embedding dynamically. In this regime, new user data is integrated as in a continuous flow as it becomes available and the order in which the data is presented is meaningful to the representation algorithm.

One way of achieving this result is to consider every event in a user's lifetime as a new piece of information for incorporation into the current representation. In this way, the system 200 is effectively updating the representation every time new information becomes available.

This process can be achieved using a recurrent neural network, such as an LSTM where the inputs are the discrete events that the model encodes into the representation (its hidden layer).

Online System of Detection

Once the representation processing is complete, the system 200 is configured to process the call data in a similar fashion as the user data, however with at least two differences:

The representation function has been pre-trained to work well with the user details;

The call details have a much smaller footprint compared to the aggregated user data, which makes it possible to process it in real (or near-real)-time.

FIG. 3 illustrates the method through which the call details are processed before being handed to the assessment system. The method generates call vector representations.

FIG. 4 illustrates the method through which the user details have to go through before being handed to the assessment system. The method generates the user vector representations or vectorized embeddings.

To summarize, as shown in FIG. 1, once a user initiates a call, three processes are executed in parallel: (a) fetch the user data vectorized representation (computed offline); (b) compute the call detail vectorized representation (computed online); (c) fetch the user profile for decision making.

With (a) and (b), the system 200 uses either a generative model, a distance metric or a full machine learning model to assess whether the call is likely to have been placed by the user. This assessment process can also be trained offline and should be updated frequently.

From this likelihood assessment, the user profile (c) is queried to make a decision on how to handle the call. Example decisions include connecting or terminating the call, report the call to a security operator, forward the call, flag the call to be marked as a potential threat in the user profile, initiate further inquiries, etc. FIG. 1 is an illustration of an example process in accordance with the above.

Once a decision has been made, the user profile can be updated to reflect the decision and new information and a log of all decisions should be kept for later revision or as new data used to refine the models.

Additional Data Sources

External data sources can be used to extract indicators that the device (e.g., phone) may be compromised and/or the user may be the victim of identity theft.

Given the availability of data, such indicators may comprise: online presence of user accounts and/or session credentials on the Web as indicators that the user account may be compromised; detection of malicious network activity and anomalies from the user's network traffic as indicators that the user's system, and by extension the phone, may be compromised; given the version of the user's phone, one can extract the presence of known unpatched security vulnerabilities, if any, on the phone.

Neural Network

Embodiments described herein can use a neural network to generate vectorized representations or features of data. The can include user features and call features. The following provides technical details for example implementations.

Let U be the set of all users, C be the set of all calls and F be the set of all possible features of either users or calls. The elements of each of those sets are vectors from Rd with d being typically between 100 and 1000. Smaller values of d are quicker to train and use while richer ones tend to be more accurate (with diminishing returns). Each user is represented by a set of features that describes them. For example: location, operator, phone plan, etc. A user can be defined as:

$$u_i = \sum_{j \in J_i} \mathcal{F}_j$$

where $J_i$ indexes which features are applicable to the user $U_i$. Calls can be similarly defined from the same set of features.

The features $\mathcal{F}_i \in \mathbb{R}$ can be either learned directly (by initializing them randomly) or encoded using a shallow neural network (or any other function). The former is recommended for categorical variables, while the latter is better for real-valued variables. The model then tries to evaluate whether a call $C_i$ has been placed by a user $U_j$ by evaluating its likelihood.

As noted, the representations can be generated using a static or dynamic process.

The static version of the method does not take into account the order of the call history from the user. It trains the model and feature dictionary by minimizing the distance between the user representation and all the calls placed by that user while simultaneously maximizing the distance between the user and all other calls. In other words, given a user Ui and a call history $\mathcal{C} j \in J_i$ it tries to minimize the entropy with respect to the feature dictionary.

$$\mathcal{L}(\mathcal{U}_i, C_{j \in J_i}) = -\sum_{j \in J_i} \log P(C_j \mid \mathcal{U}_i)$$

where P is dened as the softmax over possible calls. In effect, this makes calls passed from a user more likely while making all other ones less likely. Since P is computationally prohibitive, one can approximate it by sampling k negative examples:

$$P(C_j \mid \mathcal{U}_i) = \frac{e^{\Delta(\mathcal{U}_i, C_j)}}{\sum_{j \notin J} e^{\Delta(\mathcal{U}_i, C_j)}}.$$

The similarity function $\Delta$ can be various aspects, such as the inner product of the vectors or the cosine distance, in accordance with various embodiments.

The dynamic version keeps track of the ordering of the calls made, thus naturally putting more emphasis on the recent past activities. This version is more robust to the evolution in the behavior of the users at the cost of being more computationally heavy. From the same representation as a sum of features, $U_i$ is used to initialize the hidden layer of a recurrent neural network (either a plain recurrent neural network, a gated recurrent unit neural network or the popular long short-term memory neural network):

$$h_0 = \mathcal{U}_i.$$

Then, the calls Cj from the user's history are fed, in order, to the neural network:

$$h_t = V h_0 + W C_{t(j)} + b$$

where t(j) is an enumeration of the j from Ji.

The last hidden layer $h_T$ is then used to validate a new calls using the likelihood function $$P(C_j \mid h_T) = \frac{e^{\Delta(h_T, C_j)}}{\sum_{j \notin J} e^{\Delta(h_T, C_j)}}$$

which again needs to be approximated using samples from the calls not from that user. The feature dictionary and the RNN's parameters are optimized using the negative log-likelihood loss function, which translates to:

$$\arg\min \mathcal{L}(\mathcal{U}_i, \mathcal{C}_{j \in J_i}) = \arg\min -\log P(\mathcal{C}_j \mid h_T).$$

The resulting model can be used as calls come in by fetching the precomputed Ui if using the static method or the $h_T$ if using the dynamic method (denoted H) while the current known call details are encoded from the features F to form $C_c$. Then, the likelihood $P(\mathcal{C}_c \mid H)$ is computed and passed to the decision system.

In an aspect, there is provided a physical special purpose computing appliance configured for integration with one or more computing devices resident in a data center, the physical special purpose computing appliance including specialized hardware and software for implementing the system for anomaly estimation for a telephonic call in accordance with any one of the above aspects or embodiments.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer implemented method for anomaly estimation for a telephonic call, the method comprising:
   receiving a call object including an identifier field associating the call object to a purported user;
   retrieving a user data object associated with the purported user, and processing the user data object to retrieve one or more vectorized user features associated with the purported user;
   extracting, from the call object, one or more vectorized call features;
   retrieving a user profile associated with the purported user;
   processing the one or more vectorized call features and the one or more vectorized user features through a machine learning model to generate an output data value representing a likelihood at which the machine learning model assesses the call object to have been initiated by the purported user; and
   querying the user profile using at least the generated likelihood to obtain a decision output representative of a control signal for a downstream action for call handling;

wherein the user profile is a data structure that includes data fields that are appended with each decision output such that the user profile provides a log of past decision outputs.

2. The method of claim 1, wherein the one or more vectorized call features extracted from the call object are static embeddings extracted from at least one of a call detail record, an IP detail record, voice samplings, or records extracted from external data sources.

3. The method of claim 2, wherein the one or more vectorized call features include at least one of phone numbers originating and receiving the call, a starting timestamp of the call, a billing phone number that is charged for the call, internet protocol detail record sequence numbers, internet protocol detail record start timestamps or end timestamps, internet protocol detail record average packet latencies, internet protocol detail record codecs, internet protocol detail record internet protocol addresses, internet protocol detail record call completion codes, an internet protocol detail record personal identification number (PIN), internet protocol detail record port numbers, or internet protocol detail record egress device internet protocol addresses.

4. The method of claim 1, wherein the call object is a new call object received at a call router; and
wherein the one or more vectorized call features extracted from the call object are dynamic embeddings extracted from at least one of a call detail record, an IP detail record, voice samplings, or records extracted from external data sources, the dynamic embeddings generated as the new call object is handled by the call router in real or near real-time.

5. The method of claim 4, wherein the one or more vectorized call features are extracted in a continuous flow as the one or more vectorized call features become available during the call in real or near real-time.

6. The method of claim 5, wherein the machine learning model continuously or periodically generates the output data value as new one or more vectorized call features become available to the machine learning model.

7. The method of claim 6, wherein the machine learning model is implemented using a recurrent neural network configured such that inputs are discrete events that the machine learning model encodes into a hidden layer of the recurrent neural network.

8. The method of claim 1, wherein the machine learning model generates a manifold representation based at least on the one or more vectorized user features and the one or more vectorized call features, establishing a constellation of points within a higher-dimensional space having at least a first point representative of the call object, and at least a second point representative of the user profile associated with the purported user;
wherein a distance is determined in the higher-dimensional space between the first point and the second point; and
wherein the distance is utilized to generate the output data value representing the likelihood at which the machine learning model assesses the call object to have been initiated by the purported user.

9. The method of claim 8, wherein the distance is normalized based on an aggregate of generated distances, and the normalized distance is utilized to generate the output data value representing the likelihood at which the machine learning model assesses the call object to have been initiated by the purported user.

10. The method of claim 1, wherein the downstream action includes at least one of: connecting or terminating the call; reporting the call; or flagging the call to be marked as a potential threat in the user profile.

11. The method of claim 1, wherein the machine learning model generates a confidence level associated with the likelihood at which the machine learning model assesses the call object to have been initiated by the purported user, the confidence level utilized in determining the decision output representative of the control signal for the downstream action for call handling.

12. A system for anomaly estimation for a telephonic call, the system comprising:
at least one processor operating in conjunction with computer memory, the at least one processor configured for providing:
a call object receiver receiving a call object including an identifier field associating the call object to a purported user;
a user data object receiver retrieving a user data object associated with the purported user, and processing the user data object to retrieve one or more vectorized user features associated with the purported user;
a feature processing engine extracting, from the call object, one or more vectorized call features;
a data storage maintaining in data storage a user profile associated with the purported user;
a neural network processing the one or more vectorized call features and the one or more vectorized user features through a machine learning model to generate an output data value representing a likelihood at which the machine learning model assesses the call object to have been initiated by the purported user; and
a call routing decision support engine querying the user profile using at least the generated likelihood to obtain a decision output representative of a control signal for a downstream action for call handling;
wherein the user profile is a data structure that includes data fields that are appended with each decision output such that the user profile provides a log of past decision outputs.

13. The system of claim 12, wherein the one or more vectorized call features extracted from the call object are static embeddings extracted from at least one of a call detail record, an IP detail record, voice samplings, or records extracted from external data sources.

14. The system of claim 12, wherein the call object is a new call object received at a call router; and
wherein the one or more vectorized call features extracted from the call object are dynamic embeddings extracted from at least one of a call detail record, an IP detail record, voice samplings, or records extracted from external data sources, the dynamic embeddings generated as the new call object is handled by the call router in real or near real-time.

15. The system of claim 14, wherein the one or more vectorized call features are extracted in a continuous flow as the one or more vectorized call features become available during the call in real or near real-time.

16. The system of claim 15, wherein the machine learning model continuously or periodically generates the output data value as new one or more vectorized call features become available to the machine learning model.

17. The system of claim 16, wherein the machine learning model is implemented using a recurrent neural network configured such that inputs are discrete events that the machine learning model encodes into a hidden layer of the recurrent neural network.

18. The system of claim 12, wherein the machine learning model generates a manifold representation based at least on the one or more vectorized user features and the one or more vectorized call features, establishing a constellation of points within a higher-dimensional space having at least a first point representative of the call object, and at least a second point representative of the user profile associated with the purported user;

wherein a distance is determined in the higher-dimensional space between the first point and the second point; and wherein the distance is utilized to generate the output data value representing the likelihood at which the machine learning model assesses the call object to have been initiated by the purported user.

19. A non-transitory computer readable medium storing machine interpretable instructions, which when executed by a processor, cause the processor to perform a method for anomaly estimation for a telephonic call, the method comprising:

receiving a call object including an identifier field associating the call object to a purported user;

retrieving a user data object associated with the purported user, and processing the user data object to retrieve one or more vectorized user features associated with the purported user;

extracting, from the call object, one or more vectorized call features;

retrieving a user profile associated with the purported user;

processing the one or more vectorized call features and the one or more vectorized user features through a machine learning model to generate an output data value representing a likelihood at which the machine learning model assesses the call object to have been initiated by the purported user; and querying the user profile using at least the generated likelihood to obtain a decision output representative of a control signal for a downstream action for call handling;

wherein the user profile is a data structure that includes data fields that are appended with each decision output such that the user profile provides a log of past decision outputs.

* * * * *

UNITED STATES PATENT AND TRADEMARK OFFICE
CERTIFICATE OF CORRECTION

PATENT NO. : 10,965,807 B2
APPLICATION NO. : 16/585206
DATED : March 30, 2021
INVENTOR(S) : Marie-Claude Côté et al.

Page 1 of 1

It is certified that error appears in the above-identified patent and that said Letters Patent is hereby corrected as shown below:

On the Title Page

Item (73) Assignee:
"ELEMENT AI INC., MONTREAL (CA)"
Should read:
-- SERVICENOW CANADA INC., MONTREAL (CA) --

Signed and Sealed this
Thirteenth Day of December, 2022

Katherine Kelly Vidal
*Director of the United States Patent and Trademark Office*